US012670099B2

(12) United States Patent
Sheng

(10) Patent No.: US 12,670,099 B2
(45) Date of Patent: Jun. 30, 2026

(54) ADDRESS TRANSLATION PRELOADING INTO INPUT-OUTPUT MEMORY MANAGEMEN UNIT (IOMMU) FROM PROCESSOR'S REGISTERS

(71) Applicant: Advanced Micro Devices, Inc., Santa Clara, CA (US)

(72) Inventor: Wei Sheng, Shanghai (CN)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/536,814

(22) Filed: Dec. 12, 2023

(65) Prior Publication Data

US 2025/0190351 A1 Jun. 12, 2025

(51) Int. Cl.
G06F 12/0862 (2016.01)
(52) U.S. Cl.
CPC ................................ G06F 12/0862 (2013.01)
(58) Field of Classification Search
CPC .................................................. G06F 12/0862
See application file for complete search history.

(56) References Cited

U.S. PATENT DOCUMENTS

2008/0209130 A1* 8/2008 Kegel ................. G06F 12/1081
711/135
2023/0401160 A1* 12/2023 Huggahalli ......... G06F 12/1027

* cited by examiner

*Primary Examiner* — Chie Yew
(74) *Attorney, Agent, or Firm* — Slater Matsil, LLP

(57) ABSTRACT

A method of preloading address translation information directly into cache memory of an IOMMU includes storing the address translation information in a register set of memory management input/output registers of an input-output memory management unit and loading the address translation information into cache memory of the input-output memory management unit. The address translation information includes a virtual address and a corresponding physical address of system memory of a computing system. The address translation information is sent by software being executed by a processor of the computing system. The address translation information is received directly from the processor.

20 Claims, 5 Drawing Sheets

Step 1A. Processor fetches translation information via table walk.

Step 1B. Set translation information into MMIO registers.

Step 2. Load translation information into caches.

600

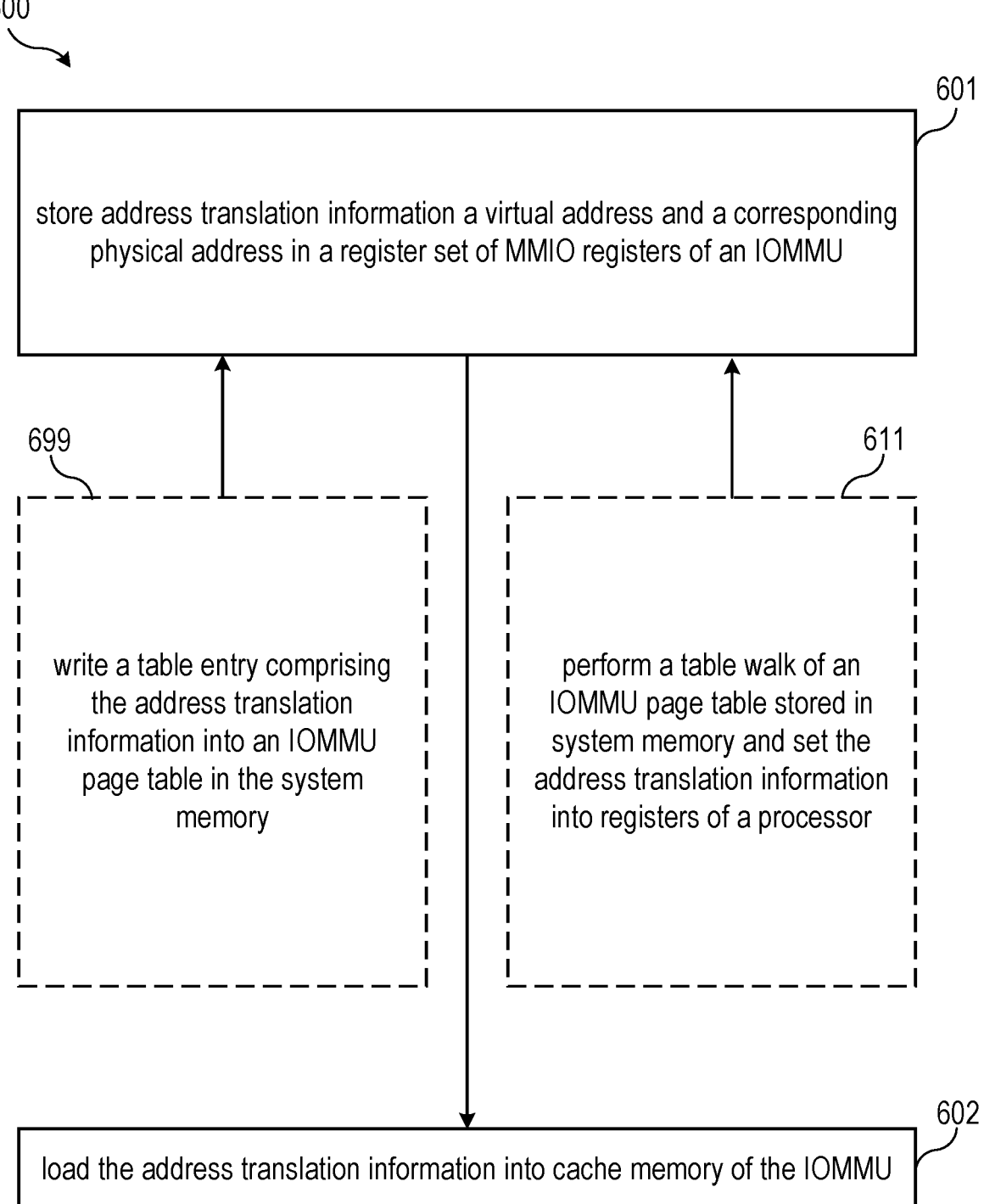

601 store address translation information a virtual address and a corresponding physical address in a register set of MMIO registers of an IOMMU

699 write a table entry comprising the address translation information into an IOMMU page table in the system memory

611 perform a table walk of an IOMMU page table stored in system memory and set the address translation information into registers of a processor

602 load the address translation information into cache memory of the IOMMU

*FIG. 6*

ADDRESS TRANSLATION PRELOADING INTO INPUT-OUTPUT MEMORY MANAGEMEN UNIT (IOMMU) FROM PROCESSOR'S REGISTERS

BACKGROUND

Modern computing systems often include peripheral devices such as input/output (I/O) devices as well as various processors (e.g., a central processing unit (CPU)) and memory components. These peripheral devices can be connected to other components of the computing system using computer buses. Memory access has historically been a bottleneck within computing systems. Although memory read/write speeds have continued to increased, memory operations still remain relatively slower than many other computing operations. Additionally, operations performed serially must wait on the previous operation to conclude before being performed.

BRIEF DESCRIPTION OF THE DRAWINGS

For a more complete understanding of the present invention, and the advantages thereof, reference is now made to the following descriptions taken in conjunction with the accompanying drawings, in which:

FIG. 6 illustrates an example method of preloading address translation information directly into cache memory of an IOMMU in accordance with embodiments of the invention.

Figure 1:
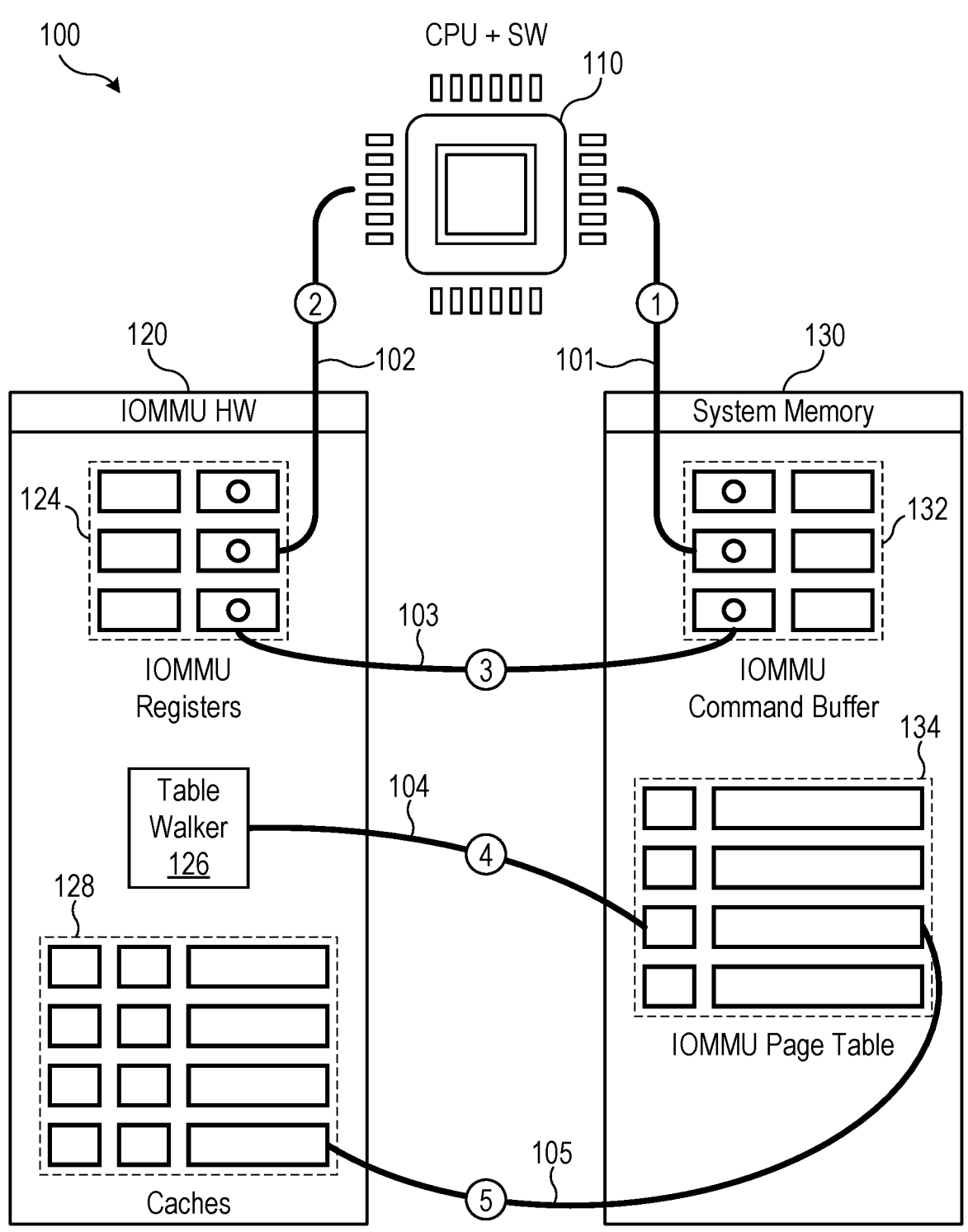
FIG. 1 illustrates an example computing system including a processor, system memory, and an IOMMU where the computing system is configured to load translation information into cache memory of the IOMMU using a prefetch command initiated by software being executed by the processor in accordance with embodiments of the invention.

Corresponding numerals and symbols in the different figures generally refer to corresponding parts unless otherwise indicated. The figures are drawn to clearly illustrate the relevant aspects of the embodiments and are not necessarily drawn to scale. The edges of features drawn in the figures do not necessarily indicate the termination of the extent of the feature.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope. Unless specified otherwise, the expressions "around", "approximately", and "substantially" signify within 10%, and preferably within 5% of the given value or, such as in the case of substantially zero, less than 10% and preferably less than 5% of a comparable quantity.

For this reason, opportunities to perform computing operations in parallel can be leveraged to further enhance computing performance. Traditionally, when peripheral device in the computing system needed access to system memory, a processor utilized programmed input/output during which all transferred data is initiated by a program being executed by the processor. Consequently, the processor is tied up during entire memory operation.

Direct memory access (DMA) is implemented in computing systems to allow peripheral devices to directly access system memory (i.e., independent from a processor such as the CPU). This direct memory access allows peripherals to perform memory operations while the processor is performing other operations. DMA requires some overhead to manage concurrent independent system memory access by separate devices. Additionally, DMA can introduce security risks, such as side channel attacks using ports in the chipset that are DMA capable.

One way to provide both address translation functionality for DMA and protection against security risks such as DMA attacks is to incorporate an input-output memory management unit (IOMMU) into the computing system as an interface between peripheral devices and system memory. The IOMMU manages a virtual address space that is visible to peripheral devices and maps the virtual addresses to the physical address space of system memory. Because only the virtual address space is visible to the peripheral devices (i.e., the DMA capable ports of the computing system), the IOMMU can act as a gatekeeper and prevent access to sensitive regions of system memory.

In order to implement the mapping of virtual addresses to physical memory addresses, an IOMMU page table storing the relationship between the active virtual addresses must be maintained in the computing system. While it is possible to include space for such a page table in the IOMMU, other components such as processors also need to have access to the IOMMU page table. Thus, the IOMMU page table is typically maintained in system memory. Each time the IOMMU grants access to a physical memory location using a virtual address, a table walk is required to ascertain the mapping between the virtual address and a physical address. Because the IOMMU page table is maintained in system memory the table walk introduces latency to the DMA process enabled by the IOMMU.

Cache memory is a type of local device memory in computer systems that is used to temporarily store data that will be or may be requested in the future. Cache memory is commonly designed to be very fast relative to other types of memory and loading data into cache memory can often be performed at convenient times during other processes prior to when the data is requested. IOMMUs may include cache memory for translation information between the virtual addresses and physical addresses. When the IOMMU receives a DMA request with a virtual address, the cache memory can be checked to see if the mapping of the virtual address is locally available. If the virtual address is in the cache memory (i.e., a cache "hit"), the performance of the DMA operation is improved.

Translation information must be loaded into cache memory of the IOMMU before the DMA request is received in order to receive a performance benefit. Therefore, improved systems, device, and methods for loading translation information into cache memory of an IOMMU may be desirable.

FIG. 1 illustrates an example computing system including a processor, system memory, and an IOMMU where the computing system is configured to load translation information into cache memory of the IOMMU using a prefetch command initiated by software being executed by the processor in accordance with embodiments of the invention.

Referring to FIG. 1, a computing system 100 includes a processor 110, an IOMMU 120, and a system memory 130. The computing system 100 is configured to execute programs using the processor 110. For example, the programs may be loaded into the system memory 130 and the processor 110 may execute the programs by performing instructions indicated by the programs. The computing system 100 is further configured to interface with hardware peripherals, such as through an I/O bus, using the IOMMU 120. The processor 110 is coupled to both the IOMMU 120 and the system memory 130.

The IOMMU 120 is hardware included in the computing system 100 (e.g., as part of the chipset of the computing system 100). The IOMMU 120 includes IOMMU registers 124 that are configured to store various information related to enabling DMA for hardware peripherals using a virtual addressing system. The IOMMU 120 also includes an IOMMU cache memory 128. The IOMMU cache memory 128 is configured to store translation information. Specifically, the translation information is a list of mapping relationships between virtual addresses in the virtual address space allocated by software and physical addresses of system memory. For example, when the software initiates the mapping, the physical address space correlating to the virtual address space allocated by the software may be restricted (e.g., by the processor 110) to mitigate or prevent side channel attacks such as DMA attacks.

The system memory 130 includes an IOMMU command buffer 132 and an IOMMU page table 134. The IOMMU command buffer 132 is configured to store IOMMU commands to be accessed (i.e. fetched) by the IOMMU 120. The IOMMU page table 134 stores the translation information that has been initiated by software being executed by the processor 110. That is, software being executed by the processor 110 sets up a page table of translation information as the IOMMU page table 134 (e.g., a process, running on the processor may have its own table, or page tables may be shared by one or more processes, programs, etc.). In comparison to the IOMMU cache memory 128, the IOMMU page table 134 can be much larger (e.g., able to store all of the currently initialized mapping relationships as opposed to just a fraction).

When the IOMMU 120 receives a DMA request, the IOMMU cache memory 128 is checked to determine if the translation information (i.e., an entry for the virtual memory address in the DMA request) exists in the IOMMU cache memory 128. If so, then there is a cache "hit" and the IOMMU 120 now knows that it already has the translation information necessary to perform the DMA request. However, if the translation information is not in the IOMMU cache memory 128, then there is a cache "miss" and the translation information must be obtained from the IOMMU page table 134.

For this reason, a table walker 126 is also included in the IOMMU 120. The table walker 126 is configured to "walk" (i.e. search, traverse, etc.) the IOMMU page table 134 to find the translation information corresponding to the virtual address included in the DMA request, but not already stored in the IOMMU cache memory 128. The translation information can then be used to perform the DMA request. Additionally, in order to facilitate a future cache hit, the translation information can also be loaded into the IOMMU cache memory 128.

Translation information can be preloaded into the IOMMU cache memory 128 using a process known as prefetching. Prefetching performs some aspects of a fetch operation ahead of time in order to speed up the actual operation when it is performed. For DMA request, having the translation information already stored in the IOMMU cache memory 128 results in a cache hit and speeds up execution of the DMA request. As a result, in the context of DMA requests, the prefetching process takes the form of causing the table walker 126 to find specific translation information in the IOMMU page table 134 and storing the translation information in the IOMMU cache memory 128 before a DMA request uses the translation information.

The first step 101 of the prefetch process is to queue an IOMMU prefetch command in the IOMMU command buffer 132. Software being executed by the processor 110 initiates the prefetching process by sending the IOMMU prefetch command to the IOMMU command buffer 132 of the system memory 130. The prefetch command includes the virtual address that will be (or will likely be) used by a future DMA request. In the second step 102 of the prefetch process, the command buffer tail pointer register of the IOMMU 120 is updated. The prefetch command is then fetched from the IOMMU command buffer 132 by the IOMMU 120 (i.e., the hardware of the IOMMU 120 obtains the prefetch instruction from the IOMMU command buffer 132 in the system memory 130) in the third step 103 of the prefetch process.

The prefetch command is executed by the IOMMU 120 which causes the table walker 126 to search the IOMMU page table 134 for an address translation entry for the virtual address. Upon finding the address translation entry in the IOMMU page table 134, this translation information is loaded (i.e., cached) into the IOMMU cache memory 128 in the fifth step 105 of the prefetching process. The fourth step 104 and fifth step 105 are similar to or the same as the steps performed if there is a cache miss during an in-flight DMA request. However, because the software initiates the prefetch process before a DMA request invokes the virtual address, the table walk and loading of the translation information happens at an earlier time (e.g., a convenient time that does not increase latency of other processes).

The computing system 100 may be any suitable type of computing system. For example, the computing system 100 may be a personal computer (PC), distributed (or partially distributed) computing system such as a cloud computing system, or an embedded computing system. The processor 110 may be a microprocessor, a microcontroller, or a specialized processor such as a media processor, a digital signal processor, an application-specific integrated circuit (ASIC)

or a field-programmable gate array (FPGA). For example, the processor 110 may be a central processor unit (CPU). The system memory 130 may include various types of memory including volatile and non-volatile memory. For example, the system memory 130 may include random access memory (RAM) such as static RAM (SRAM) and dynamic RAM (DRAM), read-only memory (ROM), and the like.

The IOMMU 120 may be a hardware module included in a chipset of the computing system 100. The IOMMU registers 124 may include one or more register sets (e.g., arranged as a set array). Each register is implemented as a hardware register and may be any suitable size. For example, 32-bit registers may be used, but 16-bit registers and 64-bit registers may also be used, as well as other sizes, if desired. The IOMMU cache memory 128 may have multiple levels (L1, L2, etc.) and may be implemented as a translation lookaside buffer (TLB) in some implementations.

Although the prefetch process may advantageously improve performance of DMA requests by ensuring (or increasing the chance) of obtaining a cache hit during a DMA request, there is latency involved with the five-step process. For example, while the prefetch process is being carried out, resources are still consumed, such as data fabric and memory bandwidth as well as power consumption. Moreover, many address mappings are transient (i.e., they exist for a single request or for a short period of time). Therefore, whereas the prefetch process may be particularly suitable for page table entries that persist for relatively long periods of time, there may be room for further improvement over the five-step prefetch process. The example computing systems described using FIGS. 2 and 3 may advantageously decrease the number of required steps to cache translation information before a DMA request using the translation information is received by the IOMMU.

In various embodiments, a method of preloading address translation information directly into cache memory of an IOMMU includes a first step of storing the address translation information in a register set of MMIO registers of an IOMMU and a second step of loading the address translation information into cache memory of the IOMMU. The address translation information includes a virtual address and a corresponding physical address of system memory of a computing system. The address translation information is sent by software being executed by a processor of the computing system. The address translation information is received directly from the processor.

For example, the address translation information may be stored in the register set by setting the address translation information in the register set from information already stored in registers of the processor. The information stored in the registers of the processor may be obtained during writing of the address translation information to an IOMMU page table stored in system memory or via a table walk performed by the processor.

Figure 2:
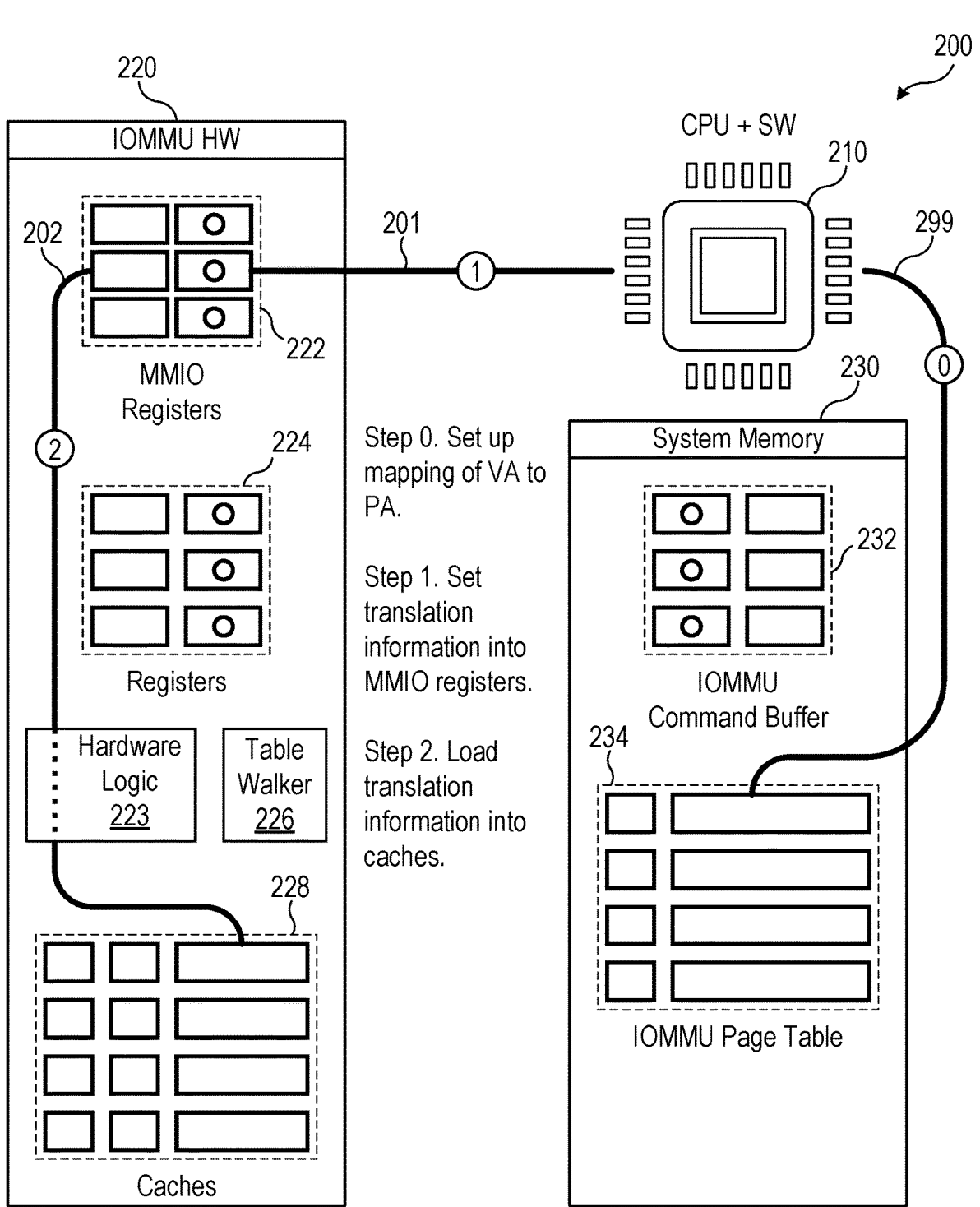
FIG. 2 illustrates an example computing system including a processor, system memory, and an IOMMU where the computing system is configured to preload address translation information into cache memory of the IOMMU using MMIO registers when the translation information is setup in a page table of system memory in accordance with embodiments of the invention.

FIG. 2 illustrates an example computing system including a processor, system memory, and an IOMMU where the computing system is configured to preload address translation information into cache memory of the IOMMU using MMIO registers when the translation information is setup in a page table of system memory in accordance with embodiments of the invention. Similarly labeled elements may be as previously described.

Referring to FIG. 2, a computing system 200 includes a processor 210, an IOMMU 220, and a system memory 230. As before, the system memory 230 includes an IOMMU command buffer 232 and an IOMMU page table 234. In addition to IOMMU registers 224, a table walker 226, and an IOMMU cache memory 228, the IOMMU 220 also includes MMIO registers 222 (e.g., memory management input/output (MMIO) registers implemented as one or more sets of hardware registers included in the IOMMU 220) and a hardware circuit 223 coupling the MMIO registers 222 to the IOMMU cache memory 228.

The MMIO registers 222 are configured to temporarily store translation information that is received directly from the processor 210 so that it can be loaded into the IOMMU cache memory 228 using the hardware circuit 223. In particular, the MMIO registers 222 are configured to store both a virtual address and a corresponding physical address and the IOMMU 220 uses the hardware circuit 223 to internally store an address translation entry in the IOMMU cache memory 228 without performing a table walk. For example, the hardware circuit 223 may be a hardware logic circuit that includes various "hard wired" logic components, such as logic gates, flip flops, etc., that store the address translation entry in the IOMMU cache memory 228 (e.g., without executing a program). In some cases, the IOMMU 220 may also use internal firmware or software during the process of storing the address translation entry in the IOMMU cache memory 228. This may advantageously decrease the number of steps required to cache address translation information thereby decreasing the latency, resource usage, and power consumption.

The computing system 200 is configured to load translation information into the IOMMU cache memory 228 using a direct preloading process. When software being executed by the processor 210 desires a DMA connection between a hardware peripheral and the system memory 230, the software sets up a page table entry in the IOMMU page table 234. This is shown as the table mapping step 299 and can refer to the addition of an entry to the IOMMU page table 234, the addition of several entries into the IOMMU page table 234, or the creation of the IOMMU page table 234 with new entries.

At this time, the software has a copy of the translation information in hand and the translation information is immediately sent to the IOMMU 220 in a first step 201 of the direct preloading process. Of course, in this context, immediately may mean concurrently, just before, or just after. In some cases, the translation information may be sent substantially immediately (i.e., at a convenient time while the translation information is still available without performing additional memory operations, such as while the information is still stored in registers of the processor 210, for example).

The IOMMU 220 is coupled to the processor 210 so that the MMIO registers 222 may directly receive the translation information from the processor 210. The translation information includes a virtual address and a corresponding physical address (so that a mapping between the two can be stored as an entry in the IOMMU cache memory 228). The translation information may include addition information such as the device ID (identification of the hardware peripheral obtaining the DMA), process address space ID (PASID, process group identification used to allow more than one process to use the same hardware peripheral), as well as flags, such as an enable bit. Other possible flags may include IW (write permission), IR (read permission), FC (force coherent), U (Untranslated access only), next level, and others.

The translation information may also include more than one mapping. Accordingly, the MMIO registers 222 may include multiple register sets (e.g., an array of register sets), each configured to store the information for a single mapping (i.e., a virtual address, a physical address, and any other information included for an entry in the IOMMU cache memory 228). Translation information including more than one mapping may be sent serially or in parallel. For example, software written to take advantage of the direct preloading process may recognize the capacity of the MMIO registers 222 and may send an appropriate number of entries to the IOMMU 220 at the same time.

In a second step 202 of the direct preloading process, the translation information stored in the MMIO registers 222 is loaded into the IOMMU cache memory 228 using the hardware circuit 223. The hardware circuit 223 may be configured to transfer the translation information to the IOMMU cache memory 228 immediately or at a specific time that is convenient for the IOMMU 220. In some cases, translation information that has been provided to the MMIO registers 222 may not be loaded into the IOMMU cache memory 228. For example, additional functionality may be included in the hardware circuit 223 to avoid duplication of entries in the IOMMU cache memory 228, dictate which entries to overwrite first (e.g., priority information), and whether or not to overwrite certain entries.

Whereas the prefetch process described using FIG. 1 disregards the fact that software being executed by the processor 210 has both the I/O virtual address information and the system memory physical address information on hand at the time that the table is created, the method of preloading address translation information by providing the virtual address-physical address pair directly to the IOMMU 220 avoids the need for a table walk by either the IOMMU 220 or the processor 210 and decreases the required signaling between the processor 210, the IOMMU 220, and the system memory 230.

This has the advantage of reducing the steps required to load the translation information into the IOMMU cache memory 228 from five steps (as in the prefetching process) to two steps (since the table mapping step always occurs independently of any prefetching or preloading process). In this way there is less signaling which beneficially reduces data fabric and memory bandwidth utilization as well as decreasing power consumption.

Another possible advantage of the direct preloading process is for transient DMA applications. For instance, there may be situations where the mapping of a virtual address to a physical address is only going to be used once, or a small number of times. In this case, the flow of the DMA for that transient DMA application may be to create the mapping in the IOMMU page table 234, provide the DMA to the hardware peripheral quickly (e.g., as soon as the relationship between the virtual address and the physical address is created or very soon thereafter), and then un-map (i.e., remove the mapping relationship from the IOMMU page table 234 and the IOMMU cache memory 228 as well). Because the translation information is loaded into the IOMMU cache memory 228 without a table walk along with the requisite entry in the IOMMU page table 234, the direct preloading process may be particularly well-suited for such transient DMA applications, which may be cycled very quickly.

Figure 3:
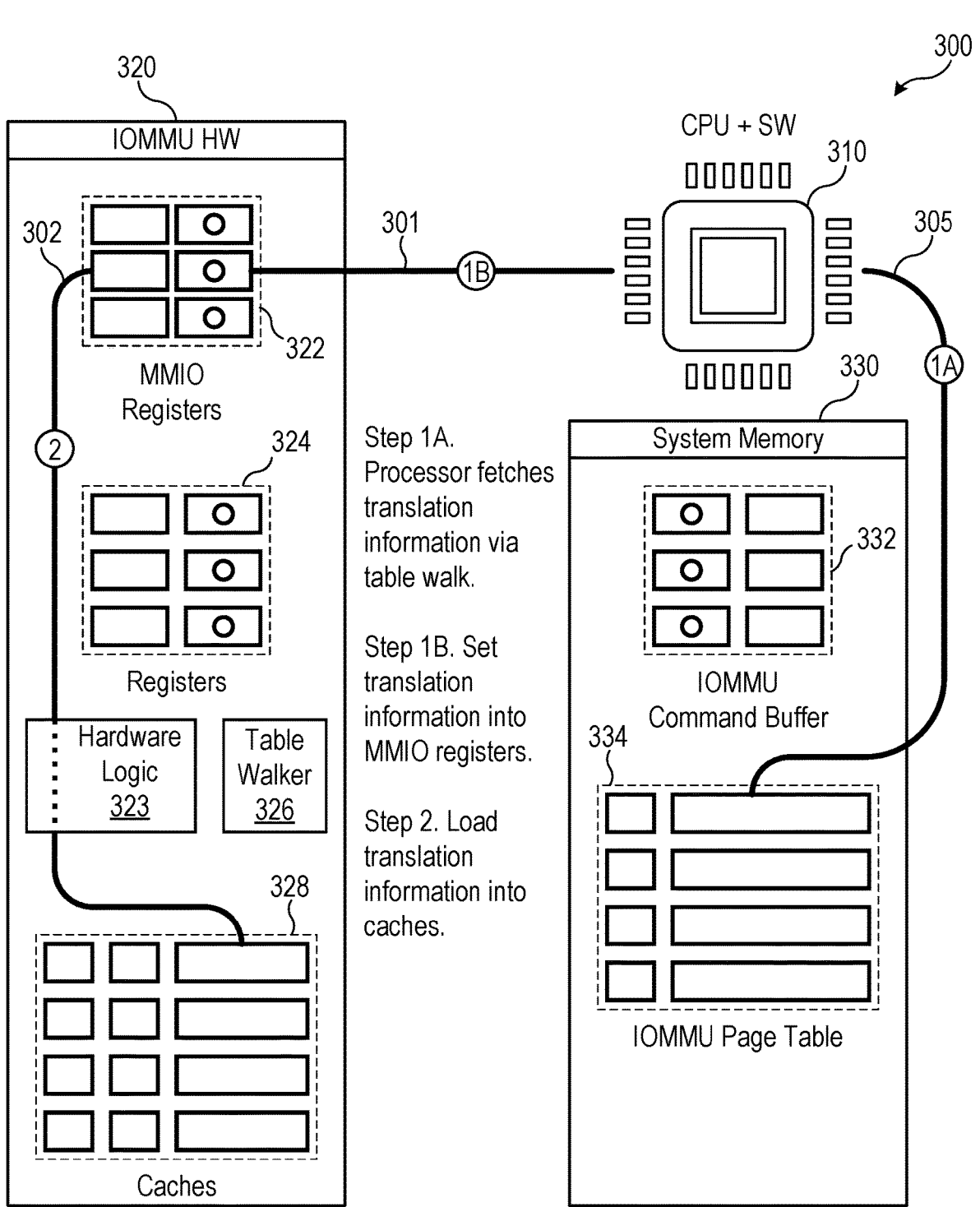
FIG. 3 illustrates an example computing system including a processor, system memory, and an IOMMU where the computing system is configured to preload address translation information directly into cache memory of the IOMMU using MMIO registers after obtaining the translation information via a processor-initiated table walk of a page table of system memory in accordance with embodiments of the invention.

FIG. 3 illustrates an example computing system including a processor, system memory, and an IOMMU where the computing system is configured to preload address translation information directly into cache memory of the IOMMU using MMIO registers after obtaining the translation information via a processor-initiated table walk of a page table of system memory in accordance with embodiments of the invention. The computing system of FIG. 3 may be a specific implementation of or demonstrate specific behavior of other computing system described herein, such as the computing system of FIG. 2, for example. Similarly labeled elements are as previously described.

Referring to FIG. 3, a computing system 300 includes a processor 310, an IOMMU 320, and a system memory 330. As before, the system memory 330 includes an IOMMU command buffer 332 and an IOMMU page table 334 while the IOMMU 320 includes a MMIO registers 322, a hardware circuit 323, IOMMU registers 324, a table walker 326, and an IOMMU cache memory 328. The computing system 300 is configured to load translation information into the IOMMU cache memory 328 using delayed preloading process, which may be distinguished from the direct preloading process described using FIG. 2 by the source of the translation information provided to the MMIO registers 322.

Specifically, in the direct preloading process, the translation information is already available to the software because of the close proximity to the table mapping step 299. However, in the delayed preloading process, the software instead instructs the processor 310 to perform a table walk to retrieve the translation information which is then provided to the MMIO registers 322. That is, in the delayed preloading process, an entry in the IOMMU page table 334 already exists (i.e., from a previous table mapping step conducted independent of any prefetching or preloading process).

At any desired point after the mapping exists in the IOMMU page table 334, the processor 310 is instructed by software being executed by the processor 310 to walk the IOMMU page table 334 and retrieve translation information in a preliminary step 305 of the delayed preloading process. After the translation information is made available to the software, the translation information is sent to the MMIO registers 322 in a first step 301 of the delayed preloading process. Similar to the direct preloading process, in a second step 302 of the delayed preloading process, the translation information stored in the MMIO registers 322 is loaded into the IOMMU cache memory 328 using the hardware circuit 323.

In comparison to the prefetching process, the delayed preloading process has the advantage or decreasing the number of steps (from five steps to two or three steps, depending on whether the processor table walk is considered an independent step, part of the first step, or a separate step). For example, the command queueing and fetch steps still absent relative to the prefetching process, making the delayed preloading process an improved version of the prefetching process, among other possible advantages.

While the direct preloading process may be particularly useful for transient DMA applications, the delayed preloading process may have the advantage of being well-suited for mappings that exist for longer periods of time in the IOMMU page table 334. The software desiring the DMA capability may be advantageously in control of when to preload (i.e. cache) certain translation information that will be used in the near future allowing software to ensure cache hits without performing an IOMMU table walk at the time of the DMA request.

Figure 4:
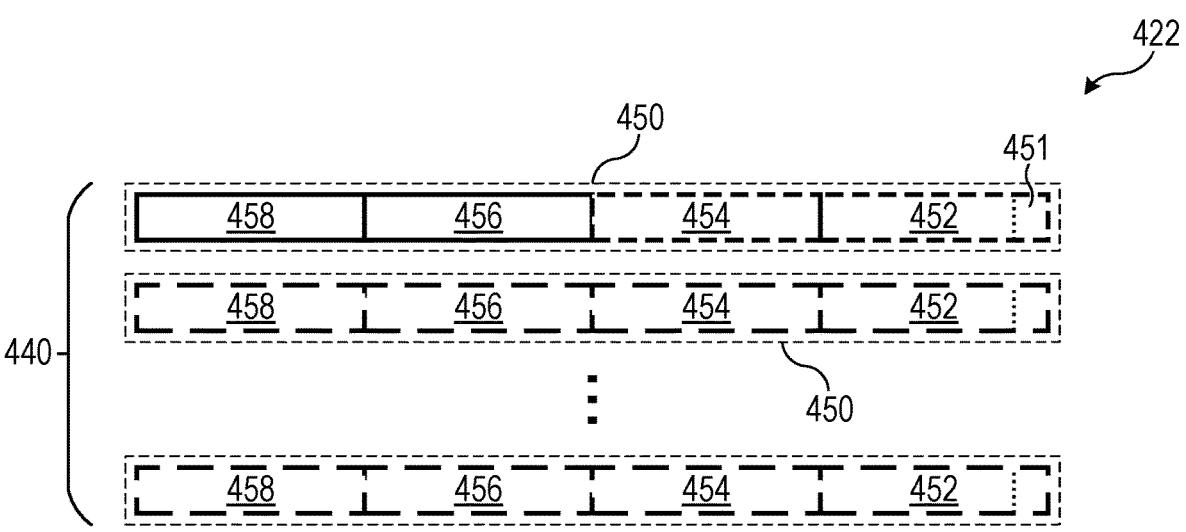
FIG. 4 illustrates example MMIO registers usable in an IOMMU of a computing system configured to preload translation information directly into cache memory of the IOMMU in accordance with embodiments of the invention.

FIG. 4 illustrates example MMIO registers usable in an IOMMU of a computing system configured to preload translation information directly into cache memory of the IOMMU in accordance with embodiments of the invention. The MMIO registers may be implemented in any of the IOMMUs described herein, such as the IOMMU of FIG. 2, for example. Similarly labeled elements may be as previously described.

Referring to FIG. 4, MMIO registers 422 includes at least one register set 450. In some implementations, the MMIO registers 422 may include more than one register set 450 arranged as a set array 440. For example, the set array 440 may have the advantage of allowing translation information to be set in parallel (although translation information could also be set serially in the set array 440, for example if there is a speed disparity between the first step and the second step of a preloading process so that translation information could temporarily buildup in the set array 440 waiting to be loaded into the IOMMU cache memory.

Each register set 450 includes VA registers 456 (virtual address registers) and PA registers 458 (physical address registers). Of course, one or both of the VA registers 456 and the PA registers 458 may be single registers, depending on the size of the registers and the size of the addresses. Additional registers may also be included, such as a device ID register 452 and/or a PASID register 454. One or more flags may also be included, such as in unused space of another register. For example, an enable bit 451 may be included in the device ID register 452 (as shown), or elsewhere, if desired.

When a preloading process is being performed (i.e., during the first step when translation information is being sent to the MMIO registers 422, the fields of the MMIO registers 422 are set. For example, the VA registers 456 and the PA registers 458 are set to the appropriate addresses, and any other fields, such as the device ID register 452 and the PASID register 454 are also set.

After, the fields are set, the enable bit 451 may be set. For example, the enable bit 451 may be configured to indicate to the hardware circuit of the IOMMU hosting the MMIO registers 422 that the translation information in the register set 450 is ready to be stored in the IOMMU cache memory. After the translation information in the register set 450 is loaded into the IOMMU cache memory, the enable bit 451 may be cleared (e.g., automatically) to indicate to the software that the register set 450 is available to store new translation data.

Figure 5:
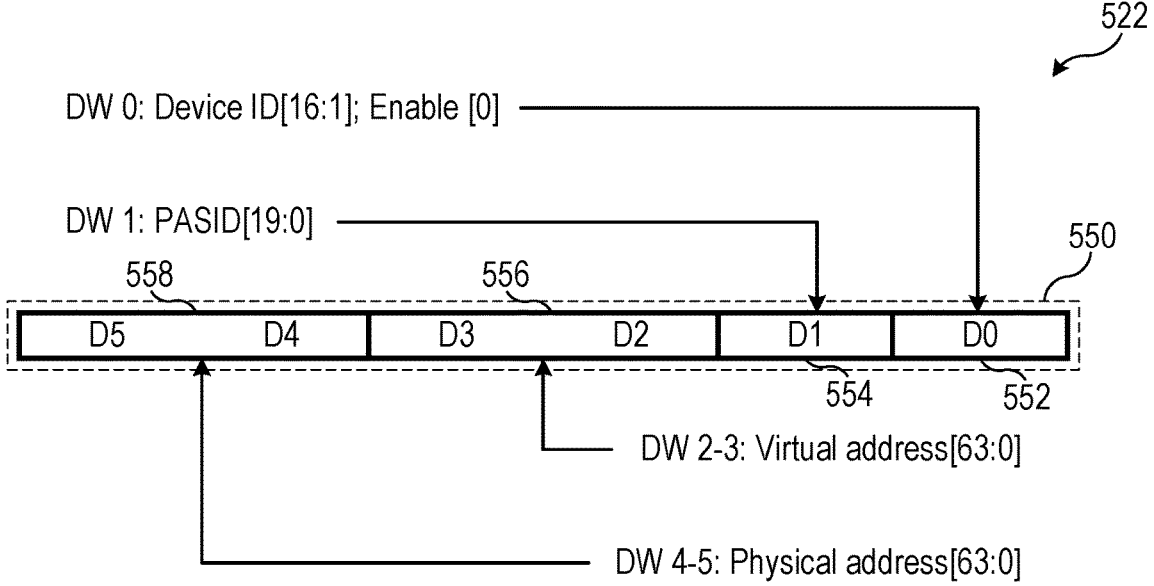
FIG. 5 illustrates example MMIO registers usable in an IOMMU of a computing system configured to preload translation information directly into cache memory of the IOMMU where the MMIO registers include a register set with six 32-bit registers in accordance with embodiments of the invention.

FIG. 5 illustrates example MMIO registers usable in an IOMMU of a computing system configured to preload translation information directly into cache memory of the IOMMU where the MMIO registers include a register set with six 32-bit registers in accordance with embodiments of the invention. The MMIO registers of FIG. 5 may be a specific implementation of other MMIO registers described herein, such as the MMIO registers of FIG. 4, for example. Similarly labeled elements may be a previously described.

Referring to FIG. 5, MMIO registers 522 include at least one register set 550. For example, although shown as a single register set 550, multiple register sets may be included in a set array, as previously described. In this specific example, the register set 550 includes a device ID register 552, a PASID register 554, VA registers 556, and PA registers 558. Each of the registers is a 32-bit register (double word using a 16-bit word size).

The device ID register 552 includes an enable bit and the device ID of the hardware peripheral to which the translation information applies. Here, the device ID is a 16-bit ID, but other sizes are possible. The enable bit may occupy separate space from the device ID within the device ID register 552 (e.g., as shown here when there are unused bits in the register). Additionally, there is no requirement for the enable bit to be in any particular location in the device ID register 552.

The PASID register 554 includes a 20-bit PASID. As with the device ID register 552, this leaves unused bits, but this is not required. The PASID may be larger or smaller. In this specific example, both the virtual address space and the physical address space support 64-bit addresses. As a result, the VA registers 556 include two 32-bit registers to store the virtual address and the PA registers 558 includes two 32-bit registers to store the physical address. This brings the total number of registers in the register set 550 to six, but of course any suitable number of registers with any suitable sizes may be utilized.

FIG. 6 illustrates an example method of preloading address translation information directly into cache memory of an IOMMU in accordance with embodiments of the invention. The method of FIG. 6 may be combined with other methods and performed using the systems and devices as described herein. For example, the method of FIG. 6 may be combined with any of the embodiments of FIGS. 1-5. Although shown in a logical order, the arrangement and numbering of the steps of FIG. 6 are not intended to be limited. The method steps of FIG. 6 may be performed in any suitable order or concurrently with one another as may be apparent to a person of skill in the art.

Referring to FIG. 6, a method 600 of preloading address translation information directly into cache memory of an IOMMU includes a step 601 of storing (e.g., by the IOMMU) the address translation information in a register set of MMIO registers of an IOMMU. The address translation information includes a virtual address and a corresponding physical address (e.g., of system memory of a computing system). The address translation information may be sent by software being executed by a processor of the computing system. In some implementations, the address translation information is received directly from the processor. The address translation information is loaded into cache memory of the IOMMU in a step 602 (e.g., by the IOMMU, such as internally within the IOMMU).

Optionally, the method 600 may further include a step 699 of writing a table entry including the address translation information into an IOMMU page table in the system memory (e.g., from information stored in registers of the processor). In this case, the address translation information is stored in the register set by setting the address translation information in the register set from the information stored in the registers of the processor. This may be a specific example of the direct preloading process as previously described.

As another option, the method 600 may also include a step 611 of performing a table walk of an IOMMU page table stored in the system memory for the address translation information (e.g., the table walk may using the processor) and setting the address translation information into registers of the processor. Also in this case, the address translation information may be stored in the register set by setting the address translation information into the register set from the address translation information set in the registers of the processor. However, when step 611 is included, the address translation information stored in the registers of the processor is obtained using the table walk instead of at the same time as writing an entry into the IOMMU page table. This may be a specific example of the delayed preloading process as previously described.

The address translation information may be loaded internally within the IOMMU using hardware circuit of the IOMMU. The register set may include an enable bit and the method 600 may further include a step of setting an enable bit of the register set to a disabled state after loading the address translation information into the cache memory. For this case, the address translation information may be stored in the register set of the IOMMU by setting the address translation information (e.g., a 4-tuple comprising the virtual address, the corresponding physical address, a process address space ID (PASID), and a device ID), and setting the enable bit to an enabled state after setting the 4-tuple.

The MMIO registers may include a plurality of register sets arranged as a set array. The address translation information may then be stored with additional address translation information in the plurality of registers sets. The address translation information and the additional address translation information may be sent in parallel or serially to the MMIO registers of the IOMMU.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for preloading address translation information comprising:
  storing, by an input-output memory management unit (IOMMU), the address translation information in a register set of memory management input-output (MMIO) registers, the address translation information comprising a virtual address and a corresponding physical address, wherein storing the address translation information in the register set comprises setting the address translation information in the register set from information stored in registers of a processor; and
  loading, by the IOMMU, the address translation information into cache memory of the IOMMU.

2. The method of claim 1, further comprising:
  writing a table entry comprising the address translation information into an IOMMU page table in system memory.

3. The method of claim 1, further comprising:
  performing a table walk for the address translation information of an IOMMU page table stored in system memory; and
  setting the address translation information into the registers of the processor.

4. The method of claim 1, wherein loading the address translation information into the cache memory comprises loading the address translation information internally within the IOMMU.

5. The method of claim 1, further comprising:
  setting an enable bit of the register set to a disabled state after loading the address translation information into the cache memory; and
  wherein storing the address translation information in the register set of the IOMMU comprises:
    setting a 4-tuple comprising the virtual address, the corresponding physical address, a process address space ID (PASID), and a device ID, and
    setting the enable bit to an enabled state after setting the 4-tuple.

6. The method of claim 1, wherein the MMIO registers comprise a plurality of register sets arranged as a set array, wherein storing the address translation information comprises storing additional address translation information in the plurality of register sets.

7. The method of claim 6, wherein storing the address translation information further comprises sending the address translation information and the additional address translation information in parallel to the MMIO registers of the IOMMU.

8. The method of claim 1, further comprising:
  receiving, by the IOMMU, the address translation information directly from the processor.

9. The method of claim 2, further comprising:
  performing a table walk for the address translation information of the IOMMU page table stored in the system memory;
  setting the address translation information into the registers of the processor;
  setting an enable bit of the register set to a disabled state after loading the address translation information into the cache memory;
  wherein storing the address translation information in the register set of the IOMMU comprises
    setting a 4-tuple comprising the virtual address, the corresponding physical address, a process address space ID (PASID), and a device ID, and
    setting the enable bit to an enabled state after setting the 4-tuple;
  wherein the MMIO registers comprise a plurality of register sets arranged as a set array, wherein storing the address translation information comprises storing additional address translation information in the plurality of register sets; and
  wherein storing the address translation information further comprises sending the address translation information and the additional address translation information in parallel to the MMIO registers of the IOMMU.

10. An input-output memory management unit (IOMMU) comprising:
  cache memory; and
  memory management input/output (MMIO) registers comprising a register set, the MMIO registers being configured to store address translation information in the register set, the address translation information comprising a virtual address and a corresponding physical address, the IOMMU being configured to load the address translation information into the cache memory internally within the IOMMU, wherein the MMIO registers are further configured to store the address translation information in the register set by setting the address translation information in the register set from information stored in registers of a processor.

11. The IOMMU of claim 10,
  wherein the register set comprises an enable bit configured to be set to an enabled state after storing the address translation information in the register set, and
  wherein the IOMMU is further configured to set the enable bit to a disabled state after loading the address translation information into the cache memory.

12. The IOMMU of claim 10, wherein the address translation information comprises a 4-tuple comprising the virtual address, the corresponding physical address, a process address space ID (PASID), and a device ID.

13. The IOMMU of claim 12,
  wherein the register set comprises an enable bit stored in a register together with the device ID, the enable bit being configured to be set to an enabled state after storing the address translation information in the register set, and
  wherein the IOMMU is further configured to set the enable bit to a disabled state after loading the address translation information into the cache memory.

14. The IOMMU of claim 10, wherein the MMIO registers comprise a plurality of register sets arranged as a set array, wherein storing the address translation information comprises storing additional address translation information in the plurality of register sets.

15. The IOMMU of claim 14, wherein the MMIO registers are further configured to receive the address translation information and the additional address translation information in parallel from the processor.

16. A computing system comprising:

system memory comprising an IOMMU page table;

an input-output memory management unit (IOMMU) comprising memory management input/output (MMIO) registers comprising a register set and cache memory, the IOMMU being configured to:

store address translation information in the register set of the MMIO registers, the address translation information comprising a virtual address and a corresponding physical address; and load the address translation information into the cache memory; and a processor configured to send the address translation information directly to the IOMMU, the IOMMU being further configured to store the address translation information in the register set by setting the address translation information in the register set from information stored in registers of the processor.

17. The computing system of claim 16, wherein the processor is configured to execute software configured to write a table entry into the IOMMU page table from the information stored in the registers of the processor.

18. The computing system of claim 16, wherein the processor is configured to execute software configured to instruct the processor to perform a table walk of the IOMMU page table for the address translation information, and instruct the processor to set the address translation information into registers of the processor.

19. The computing system of claim 16, wherein the IOMMU further comprises:

a hardware circuit configured to load the address translation information into the cache memory internally within the IOMMU.

20. The computing system of claim 16, wherein the MMIO registers comprise a plurality of register sets arranged as a set array, and wherein the processor is configured to execute software configured to send the address translation information and additional address translation information in parallel directly to the IOMMU.

\* \* \* \* \*